(No Model.)
W. KOCH.
MECHANICAL MOVEMENT.
No. 458,303. Patented Aug. 25, 1891.
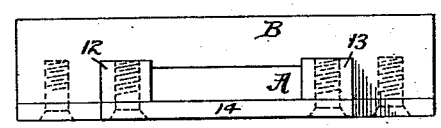
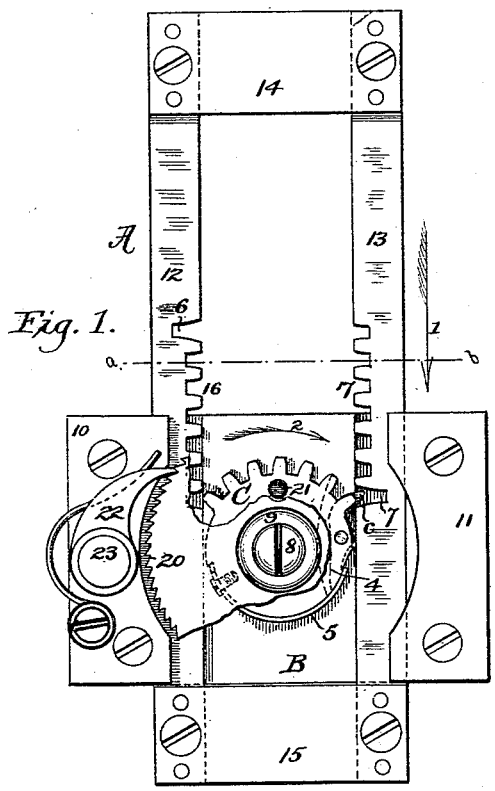
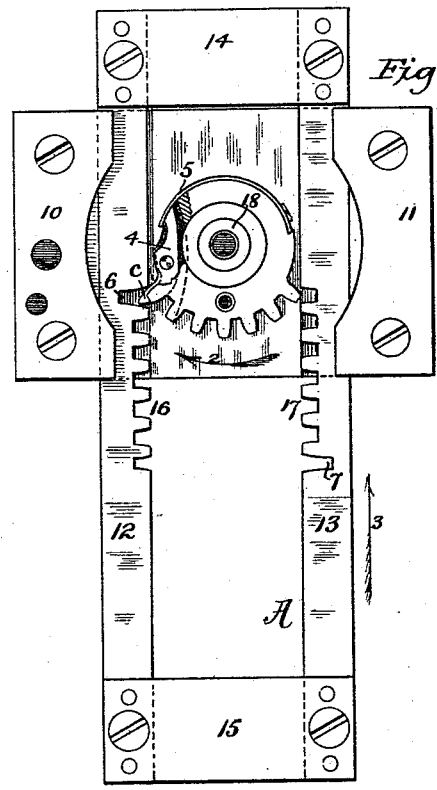
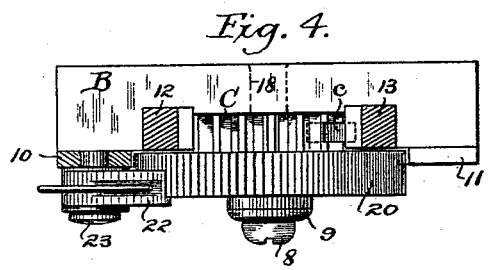
WITNESSES:
INVENTOR
William Koch
BY
ATTORNEY.

UNITED STATES PATENT OFFICE.

WILLIAM KOCH, OF NEW YORK, N. Y.

MECHANICAL MOVEMENT.

SPECIFICATION forming part of Letters Patent No. 458,303, dated August 25, 1891.

Application filed October 11, 1890. Serial No. 367,857. (No model.)

*To all whom it may concern:*

Be it known that I, WILLIAM KOCH, a citizen of the United States, residing in the city, county, and State of New York, have invented certain new and useful Improvements in Mechanical Movements, fully set forth in the following description, and represented in the accompanying drawings.

This invention relates, generally, to mechanical movements, and more particularly to that class of such movements wherein the reciprocation of a part imparts a rotary motion to another part—in other words, to a mechanical movement wherein a reciprocatory movement is converted into a rotary movement, or vice versa.

The improved mechanical movement hereinafter described is particularly designed for use where it is not possible or convenient mechanically to impart a direct rotary movement to certain parts or instrumentalities, but which embraces a movement (such as a vibratory one) that is readily imparted to a reciprocatory part, which in turn may be converted by this invention into a rotary movement, or vice versa. To this end the improved mechanical movement embraces, essentially, two toothed rack-bars, the teeth of both racks of which project toward each other, but are separated a suitable distance apart to leave a space between their opposed faces and are connected rigidly together to move bodily as a whole. Between the racks there is mounted a toothed segment or a mutilated pinion that is adapted to freely rotate in suitable bearings or upon a stud fixed from the frame-work. The teeth of the toothed segment mesh alternately with each rack, there being a sufficient number of teeth provided in the segment that as the last tooth leaves one rack the first tooth will be in position to engage with the teeth of the other rack. As it is impracticable for the rack that has just acted to rotate the segment to place the first tooth of the segment so that it will mesh with the teeth of the opposite rack and at the same time in its return movement pass the last tooth of the segment, means have been devised for effecting the proper extent of rotation imparted to the segment, so that its first tooth will mesh with the next rack that is to rotate it, while its last tooth will not interfere with the reverse movement of the racks. These means in the present invention consist in providing the toothed segment with a yielding or spring-seated tooth and slightly longer than its other teeth, which tooth as the racks complete their movement in one direction yields to allow the last tooth of the segment to pass from mesh with one rack and so that the first tooth of the segment will be in position to mesh with the other.

With this general understanding of the nature of the invention a detailed description thereof will now be given, reference being had to the accompanying drawings, in which—

Figure 1 is an elevation of one form of the invention, a ratchet-wheel, with which the toothed segment may be provided, being shown partially broken away to expose the underlying segment and showing the racks at the limit of their movement in one direction and in the act of commencing their return movement, as indicated by the arrow. Fig. 2 is a similar view, partly in section, the ratchet-wheel and pawl being omitted, with the racks at the limit of their movement in the opposite direction to that shown in Fig. 1 and in the act of commencing their reverse movement in the direction of the arrow. Fig. 3 is an end view thereof. Fig. 4 is a horizontal section taken on the line *a b* of Fig. 1.

It is to be understood that while the mechanical movement is shown independent of any means for imparting the reciprocatory movement to the racks and of any means by which the rotary movement of the toothed segment may impart its movement, yet in practice there will be suitable means connected with the racks for reciprocating them bodily in opposite directions, and there will be a connection with the toothed segment to which its movement will be imparted for any desired purpose.

The improved mechanical movement consists of a reciprocatory frame A, mounted to slide back and forth in suitable guideways formed by a support or base-plate B, the said frame being held to said guideways by a pair of overlapping plates 10 11, firmly secured to the base-plate B. The reciprocatory frame is formed by two rack-bars 12 13, supported a distance apart and connected and held rigidly together by end plates 14 15, which thus form a rectangular frame having a central opening bounded by the inner faces of the two rack-bars and the two end plates. The opposed faces of the rack-bars 12 13 are each provided with a series of teeth, forming a toothed rack 16 upon the bar 12 and a toothed rack 17 upon the bar 13. The base-plate B also provides a support for a toothed segment or mutilated pinion C. Thus said base-plate is provided with a projecting stud 18, on which the toothed segment is mounted, so as to rotate freely thereon, and is shown as held in position on the stud by means of a washer 9 and set-screw 8. The toothed segment is mounted on the stud between the inner and opposed toothed faces of the rack-bars 12 13, and is provided with a series of teeth adapted to alternately gear with the teeth of each rack, and of sufficient number to insure that each rack will impart a sufficient rotation to said segment in a complete movement of the rack-bar in one direction as that a tooth of the segment will be brought or is capable of being brought into mesh with a tooth of the other rack-bar, so that it in a complete movement in the opposite direction will have correspondingly rotated the segment and have brought a tooth of the latter into mesh with the first-named rack to repeat the operation.

In the position of the parts shown in Fig. 1 the reciprocatory frame A is shown as just having completed a movement in one direction and is about to move in the opposite direction, as indicated by the arrow 1, the toothed segment being rotated in the direction of the arrow 2. As one tooth of the toothed segment will always be the first tooth to mesh with either of the racks the tooth $c$ will be designated the "forward" or "first" tooth of the segment. In the position shown in Fig. 1 said forward tooth has just entered in mesh with the teeth of the rack-bar 13, and as the reciprocatory frame moves in the direction of the arrow the teeth of the toothed segment will mesh with the teeth 17 of the rack-bar 13 and thereby cause the segment to rotate in the direction of the arrow 2; but as the last tooth of the toothed segment is not entirely clear of the teeth 16 of the rack-bar 12 said segment would be locked upon the commencement of this movement of the reciprocatory frame because of the simultaneous engagement of the teeth of both rack-bars with the first and last tooth of the segment if provision were not made obviating this defective operation. In the present invention this is obviated by making the forward tooth $c$ of the segment slightly longer than the others and capable of yielding with respect to its peripheral edge so that it will pass a tooth of each of the racks to become in mesh therewith. This yielding tooth $c$ is provided on the end of a small lever 4, held within a recess provided in the peripheral edge of the segment and pivoted therein so that its opposite end may be borne upon by the end of a flat spring 5, and thus hold the toothed end of the lever normally outward, as shown in Figs. 1 and 2. The recess in which the yielding tooth is seated wholly divides the forward tooth and the adjacent portion of the succeeding one of the segment, so that said yielding tooth supplements the ordinary one and projects beyond its peripheral line.

In order to accommodate the increased length of the tooth $c$, the coacting portion of the rack-teeth 16 17 is deepened, as seen at 6 on the rack-bar 12 and at 7 on the rack-bar 13.

In the position of the parts shown in Fig. 1 said forward yielding tooth $c$ has just been forced by the first tooth of the rack-bar 13 by the action of the last tooth of the opposite rack-bar 12 upon the last tooth of the segment, so that the yielding tooth has entered the deepened portion 7 of the teeth of the rack-bar 13 and is in mesh therewith. The same result has been effected in Fig. 2, the reciprocatory frame having moved in the direction of the arrow 3, and just at the completion of its movement in the direction of said arrow 1 the last tooth of the teeth of the rack-bar 13 Fig. 2, has forced the segment over sufficiently to have caused its yielding tooth $c$ to pass the adjacent tooth of the teeth of the rack-bar 12, so as to enter the deepened portion 6 of that rack-bar and be in mesh with its teeth 16 ready for the return reciprocation of the frame in the direction of the arrow 3, and upon the completion of which return movement the parts will arrive again in the position shown in Fig. 1.

To insure the constant rotation of the toothed segment C in one direction and to prevent any accidental slipping between the teeth of said segment and the teeth of the racks, so that it may be in danger of getting out of time with said racks, the segment is provided with a ratchet-wheel 20 (shown partially broken away in Fig. 1) that is firmly secured thereto, so as to move in unison therewith by a screw 21, and the teeth of the ratchet-wheel are engaged by a spring-pressed pawl 22, mounted on a stud 23, projecting from the base-plate or, as shown, from the overlapping plate 10. Any danger of the racks becoming out of time with respect to the segment may also be obviated by positively limiting the movement of the reciprocatory frame in each direction. Thus the inner edge of both of the end plates 14 15 forms a stop that limits the movement of the frame in both directions by abutting alternately against the opposite sides of the base-plate B or, more strictly, its overlapping plates 10 11.

In practice the pawl and ratchet and the means just described of limiting the movement of the frame in both directions will be used together; but one or the other may be omitted, if desired.

What is claimed is—

1. The herein-described mechanical movement, consisting of a revoluble toothed segment and two toothed racks adapted in their reciprocation to alternately engage said segment, a yielding tooth carried by the segment and of a length greater than the other teeth thereof, and each of said toothed racks provided with a deepened portion, with which said yielding and lengthened tooth alternately engages.

2. The herein-described mechanical movement, consisting of a revoluble toothed segment and two toothed racks adapted in their reciprocation to alternately engage said segment, said segment being provided with a yielding tooth adapted to engage alternately with the teeth of each of the racks, a ratchet-wheel carried by said segment, and a pawl coacting therewith.

In witness whereof I have hereunto signed my name in the presence of two subscribing witnesses.

WILLIAM KOCH.

Witnesses:
GEO. H. GRAHAM,
N. MARTER.